United States Patent
Gueli et al.

(10) Patent No.: US 7,527,460 B2
(45) Date of Patent: May 5, 2009

(54) HORIZONTAL MILLING-BORING MACHINE WITH MOBILE COLUMN

(75) Inventors: Francesco Gueli, Camposampiero (IT); Gabriele Piccolo, Camposampiero (IT)

(73) Assignee: HPT Sinergy S.r.l., Padua (IT)

( * ) Notice: Subject to any disclaimer, the term of this patent is extended or adjusted under 35 U.S.C. 154(b) by 0 days.

(21) Appl. No.: 10/594,704

(22) PCT Filed: Apr. 7, 2004

(86) PCT No.: PCT/EP2004/003728

§ 371 (c)(1),
(2), (4) Date: Sep. 28, 2006

(87) PCT Pub. No.: WO2005/097402

PCT Pub. Date: Oct. 20, 2005

(65) Prior Publication Data

US 2008/0044246 A1 Feb. 21, 2008

(51) Int. Cl.
*B23C 1/027* (2006.01)

(52) U.S. Cl. ................ 409/235; 408/234

(58) Field of Classification Search ........... 409/235, 409/241, 183, 185, 190–191, 204, 206; 408/234; 82/149
See application file for complete search history.

(56) References Cited

U.S. PATENT DOCUMENTS

| | | | | |
|---|---|---|---|---|
| RE26,393 E | * | 5/1968 | Daugherty | 408/234 |
| 4,370,080 A | * | 1/1983 | Goode | 409/200 |
| 4,632,615 A | * | 12/1986 | Yamamura | 409/235 |
| 4,712,953 A | * | 12/1987 | Witzel et al. | 409/131 |
| 4,768,282 A | * | 9/1988 | Rieck et al. | 483/1 |
| 4,770,575 A | * | 9/1988 | Kolblin et al. | 409/218 |
| 4,858,290 A | * | 8/1989 | Hirose et al. | 29/35.5 |
| 5,117,552 A | * | 6/1992 | Babel | 409/235 |
| 6,224,462 B1 | * | 5/2001 | Yokoyama et al. | 451/10 |
| 6,843,624 B2 | * | 1/2005 | Sugata et al. | 409/235 |
| 7,223,221 B2 | * | 5/2007 | Sugata et al. | 483/3 |
| 2003/0126728 A1 | * | 7/2003 | Watanabe | 29/48.5 R |
| 2004/0077470 A1 | * | 4/2004 | Camozzi et al. | 409/235 |

FOREIGN PATENT DOCUMENTS

| | | |
|---|---|---|
| DE | 198 10 333 | 9/1999 |
| EP | 0 517 168 | 12/1992 |
| EP | 1 362 664 | 11/2003 |
| JP | 10-263960 A * | 10/1998 |
| JP | 2000-126953 A * | 5/2000 |
| JP | 2005-313250 A * | 11/2005 |
| WO | WO-98/19819 A1 * | 5/1998 |

* cited by examiner

*Primary Examiner*—Erica E Cadugan
(74) *Attorney, Agent, or Firm*—Hoffman, Wasson & Gitler, P.C.

(57) ABSTRACT

A horizontal milling-boring machine including a horizontal bed anchored to the floor, a column structure supported by the bed and slidable there along, a slide carriage slidabe vertically along said column structure, and a slide supporting the tool head and movable axially to said carriage in a direction perpendicular to the axis of said bed, characterized in that: said bed is monolithic and is separated from the work table,—said column structure is formed as a portal, with two columns connected together by an upper crosspiece and provided lowerly, for their support on the bed, with portions lying external to the opening of said portal, which is delimited laterally by said columns and extends lowerly into proximity with said bed—the slide carriage is slidable along the facing internal walls of said columns,—guide structure and drive structure being interposed between said column structure and said bed.

12 Claims, 8 Drawing Sheets

HORIZONTAL MILLING-BORING MACHINE WITH MOBILE COLUMN

BACKGROUND OF THE INVENTION

The present invention relates to a horizontal milling-boring machine with mobile column.

Milling machines of mobile column type are known comprising a horizontal bed anchored to the floor, a column carriage horizontally slidable along said bed, a column structure supported by said carriage, a slide carriage slidable vertically along said column structure, a slide slidable horizontally along said carriage in a direction perpendicular to the longitudinal axis of said bed, and a spindle head mounted on the end of said slide and facing a work table to which the workpiece to be machined is fixed.

A recurrent problem in these milling machines consists of the fact that the bed and the column carriage result in an excessive height of the spindle axis from the work table, this being a serious impediment both to accessibility and visibility of the workpiece being machined, especially for tall regions of the workpiece.

SUMMARY OF THE INVENTION

To overcome this drawback it has already been proposed to anchor the bed to the bottom of a pit previously made in the floor of the room in which the machine is to be installed, and to anchor the work table to the floor, parallel to said pit.

By virtue of this solution it has been possible to set the spindle axis in a lower vertical position very close to the work table and in certain cases even below it. At the same time this known solution has also resulted in certain drawbacks, and in particular:

- cost: considering that a pit can have a depth of 2 meters, a width of 4 meters and a length of 15 meters, it is immediately apparent that a pit requires excavation work of more than one hundred cubic meters, a lining for the bottom and side walls of the pit which is impermeable to the refrigeration and lubrication liquids normally used during machining, walkways for operator movement in proximity to the machine and/or workpiece, a conveyor for machining swarf and chippings, located in the bottom of the pit, a tray provided in the bottom of the pit for collecting said refrigeration and lubrication liquids, and a bilge pump for transferring the liquids from the tray to the main machine tank;
- limited safety because of the presence of the pit: this drawback means that fixed or movable barriers must be used, able to protect only personnel in transit not involved in the machining, but ineffective for the operators who, because of the presence of control members in the machine, have to work within the barrier-protected areas;
- the fact that the installation area is suitable only for this exclusive use; in reality, the pit could always be filled in and the floor of the room in which the machine was installed be restored, however this would involve considerable difficulties and high costs for remaking the floor, and for repeating the operations involved in forming a new pit in a different area.

EP-1 362 664 describes a machine of the type with a mobile column along a bench in a horizontal axis X. The column has two halves which from their top part, enlarges towards the base, forming a large base in which each half has primary with linear synchronous motor, with the secondary being longitudinally aligned on the bench, this bench having three linear guides which, with the tracks disposed in the base of the halves of the column, allows rapid displacement of the column along the axis X without requiring the top guide of the column.

An object of the invention is to solve this problem by making it possible to install in particular a horizontal milling-boring machine without requiring excavation work, but at the same time such that the spindle axis lies very close to the machine work table.

BRIEF DESCRIPTION OF THE DRAWINGS

Preferred embodiments of the present invention are described in detail hereinafter with reference to the accompanying drawings, in which.

DETAILED DESCRIPTION OF THE INVENTION

Figure 1:
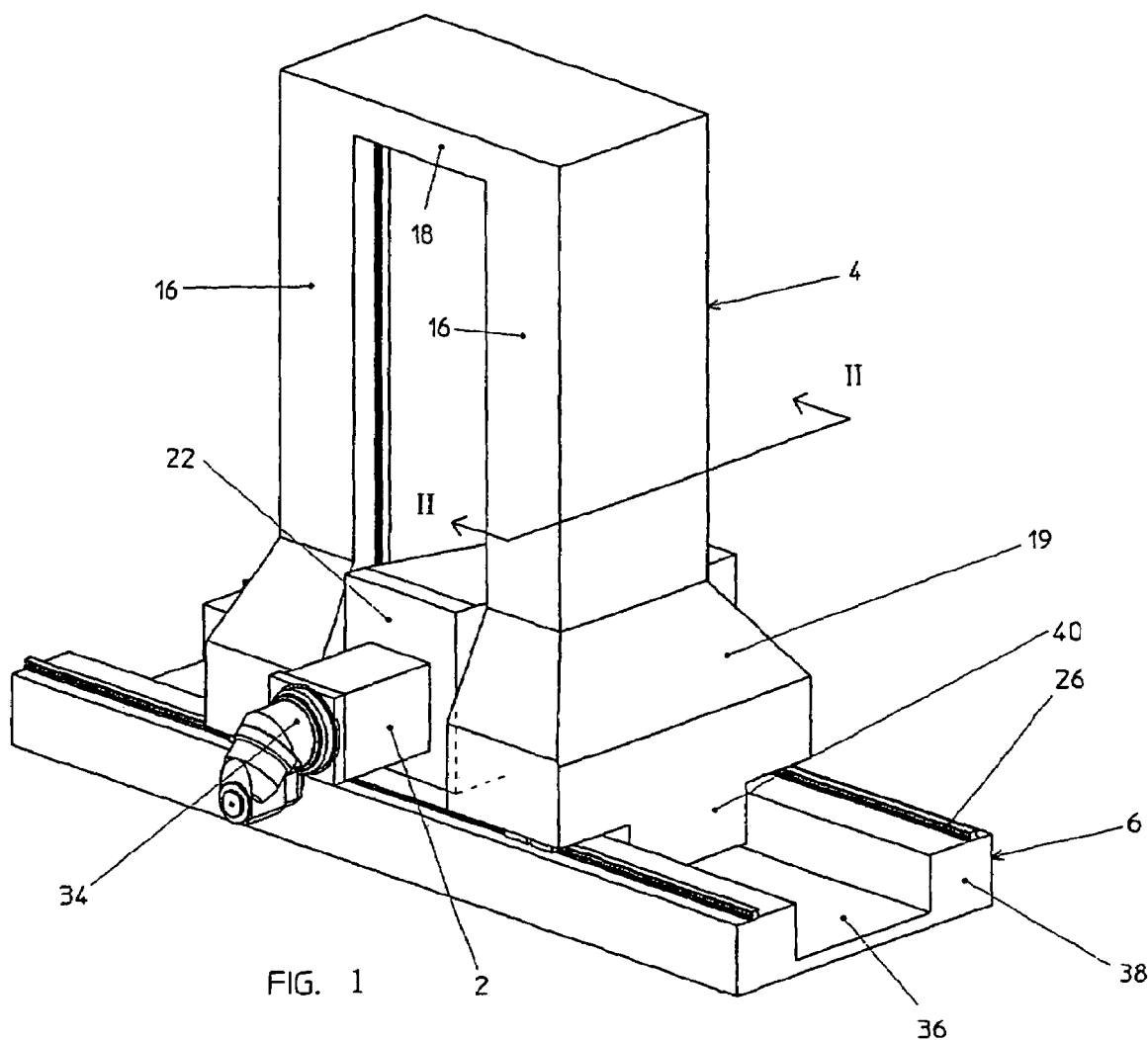
FIG. 1 is an overall schematic perspective view of a first embodiment of a milling-boring machine according to the invention.

As can be seen from FIGS. 1-4, a first embodiment of the milling-boring machine of the invention is essentially a machine of known mobile column type, i.e. with a horizontal slide 2 movable axially and also movable vertically along a column structure 4, which itself is movable horizontally in a direction perpendicular to the axis of the slide 2, along a bed 6 anchored to the floor 8.

More specifically, not only the bed 6 is anchored to the floor 8 but also a work table 10 separated from the bed and provided with grooves 12, on which the workpiece 14 to be machined can be fixed in traditional manner.

The column structure 4 is of symmetrical portal type and comprises a pair of columns 16, which are joined together upperly by a crosspiece 18 and are prolonged lowerly into a pair of portions 19, the function of which is to support the column structure 4 on the bed 6 in a stabilized manner.

A carriage 22 supporting and axially guiding the slide 2 is slidable vertically along the facing inner walls of the columns 16. As the systems for vertically driving said carriage 22 are traditional, they do not require a more detailed description.

As stated, the carriage 22 supports the slide 2 and is provided with traditional members for guiding and driving this latter in an axial direction, i.e. in a horizontal direction perpendicular to the axis of the bed 6.

The vertical movement of the carriage 22 along the column structure 4 involves the entire inner opening of the column structure, bounded upperly by the crosspiece 18 and lowerly by the upper surface of the bed 6 or by a non structural thin connection between the two columns 16.

Figure 2:
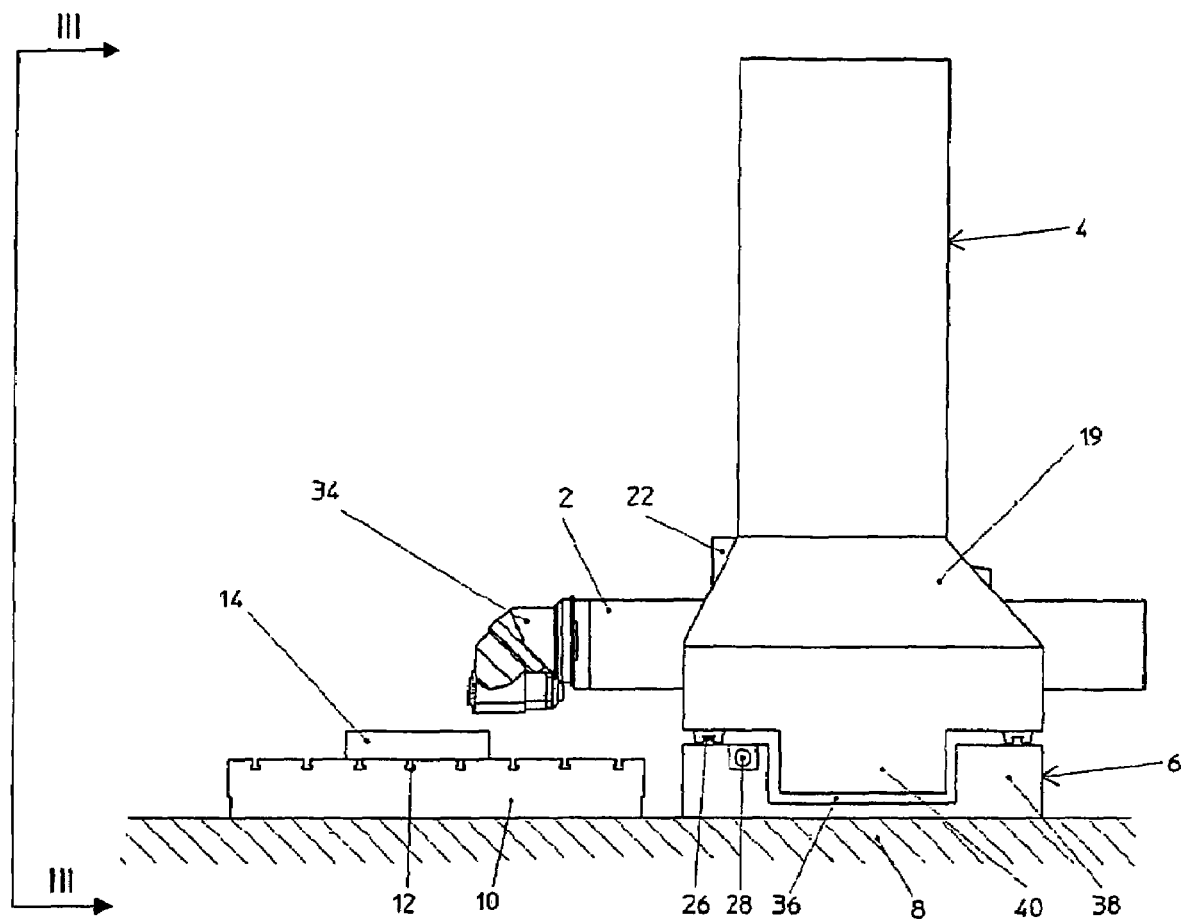
FIG. 2 shows it in the side view II-II of FIG. 1.
Figure 3:
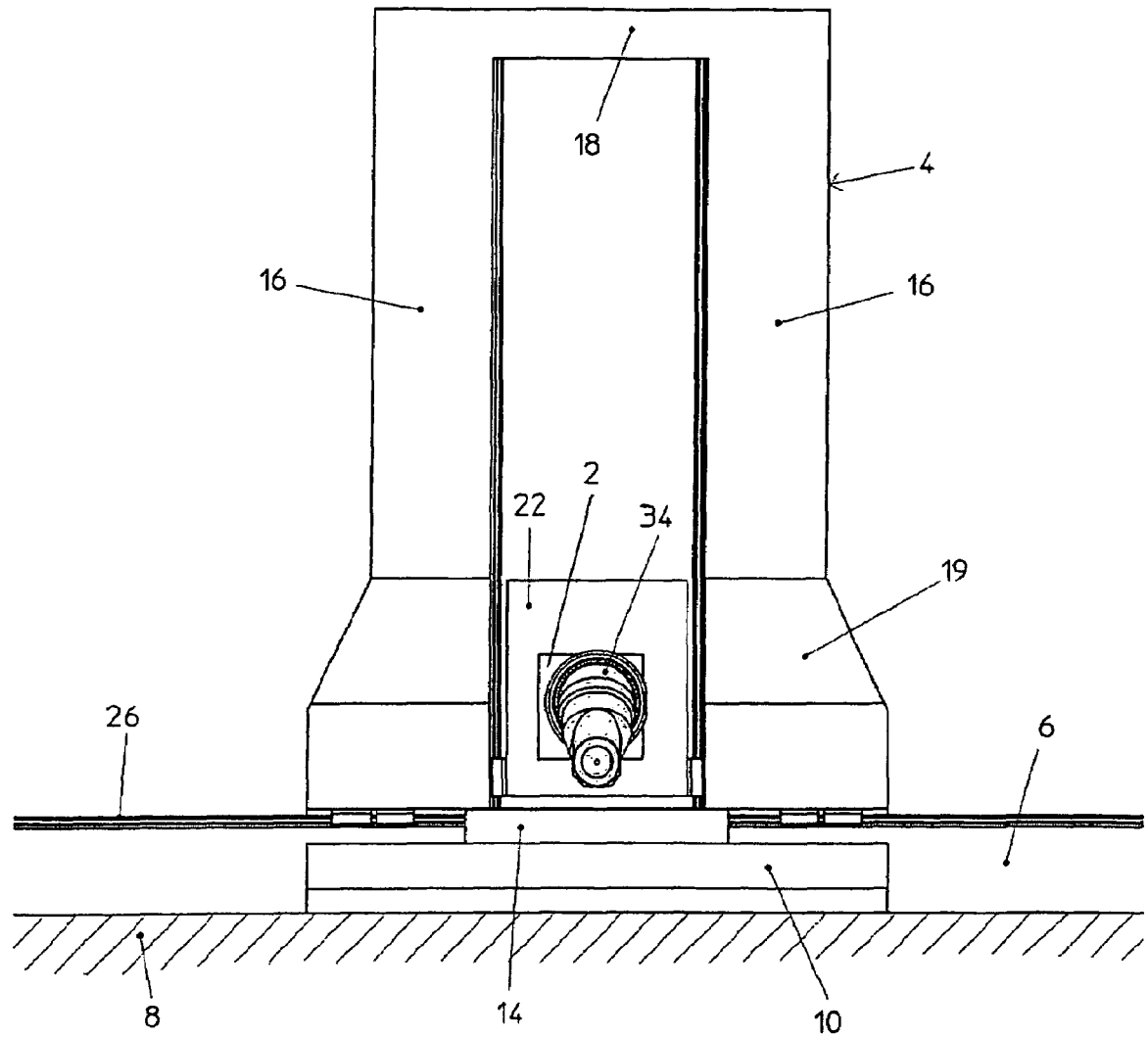
FIG. 3 shows it in the view III-III of FIG. 2.
Figure 4:
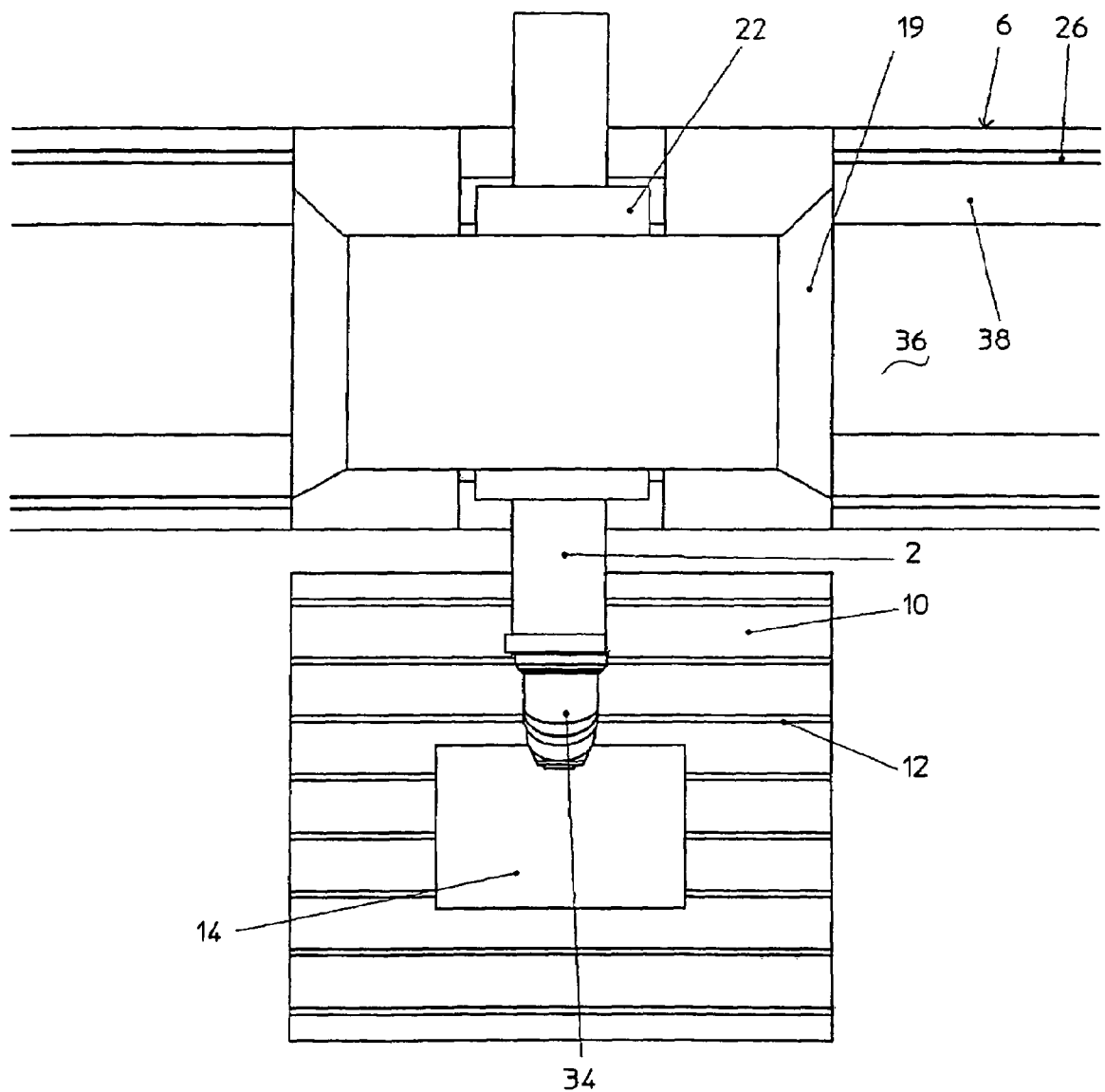
FIG. 4 shows it in plan view.
Figure 5:
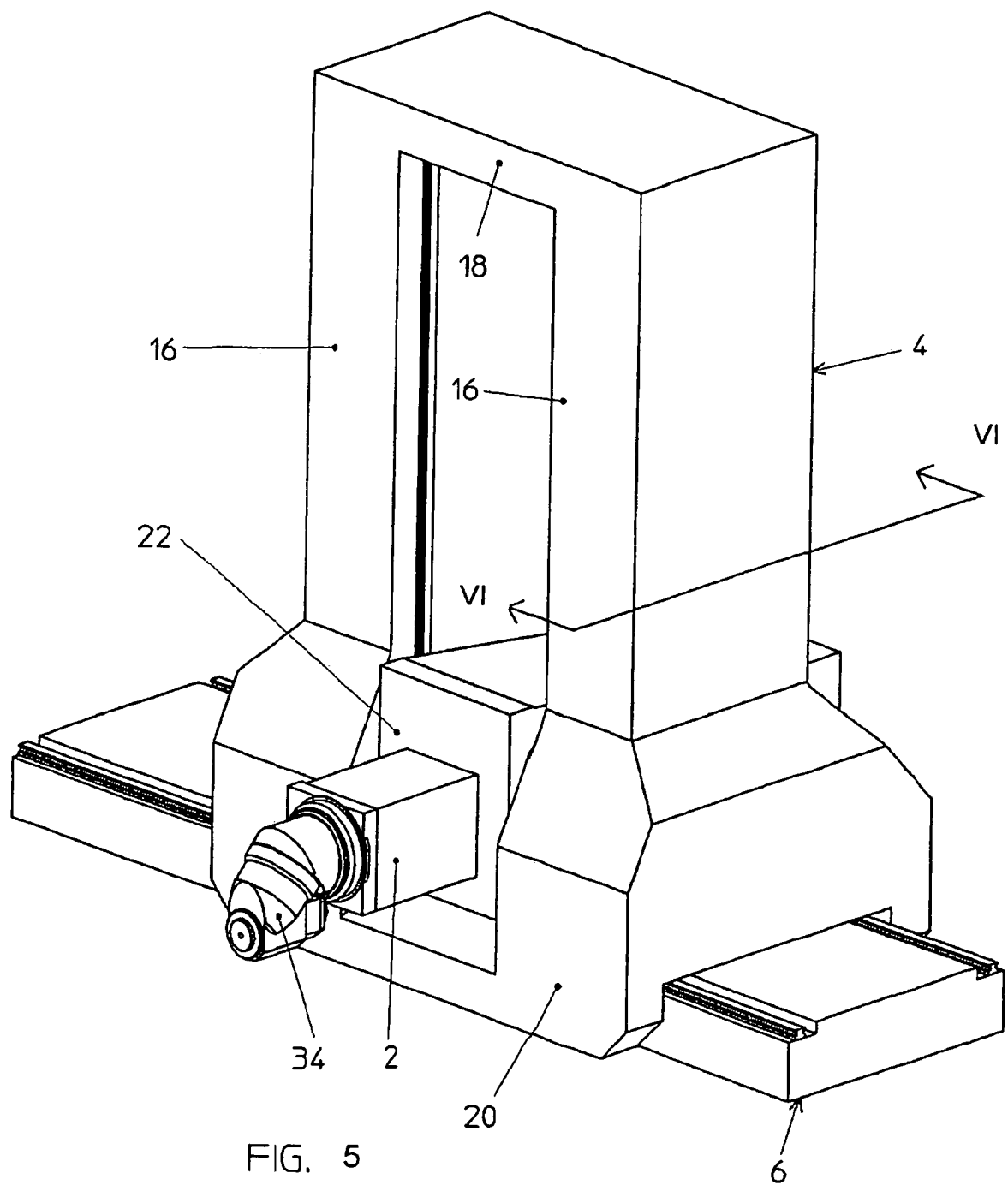
FIG. 5 shows a second embodiment thereof in the same perspective view as FIG. 1.
Figure 6:
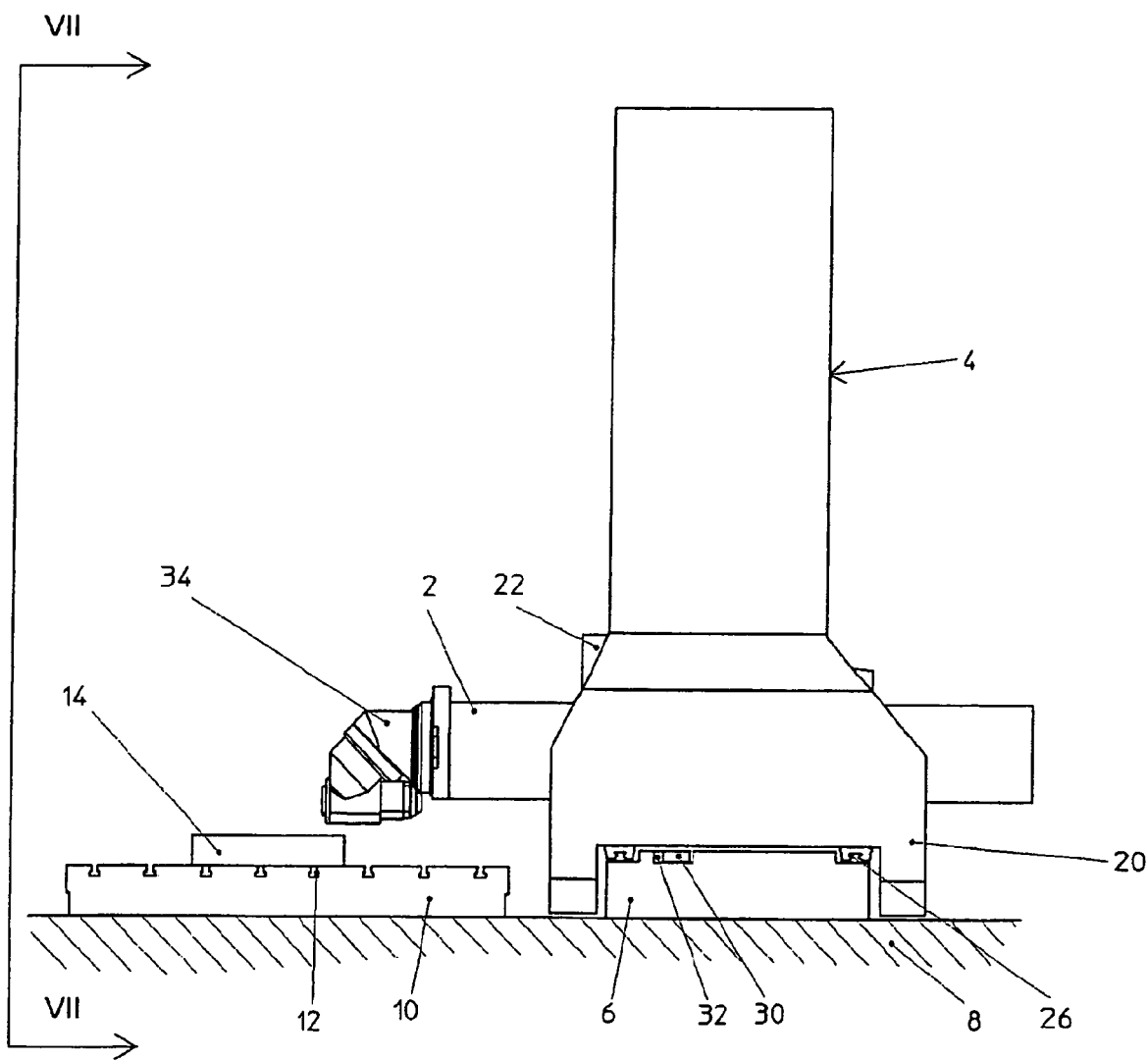
FIG. 6 shows it in the side view VI-VI of FIG. 5.
Figure 7:
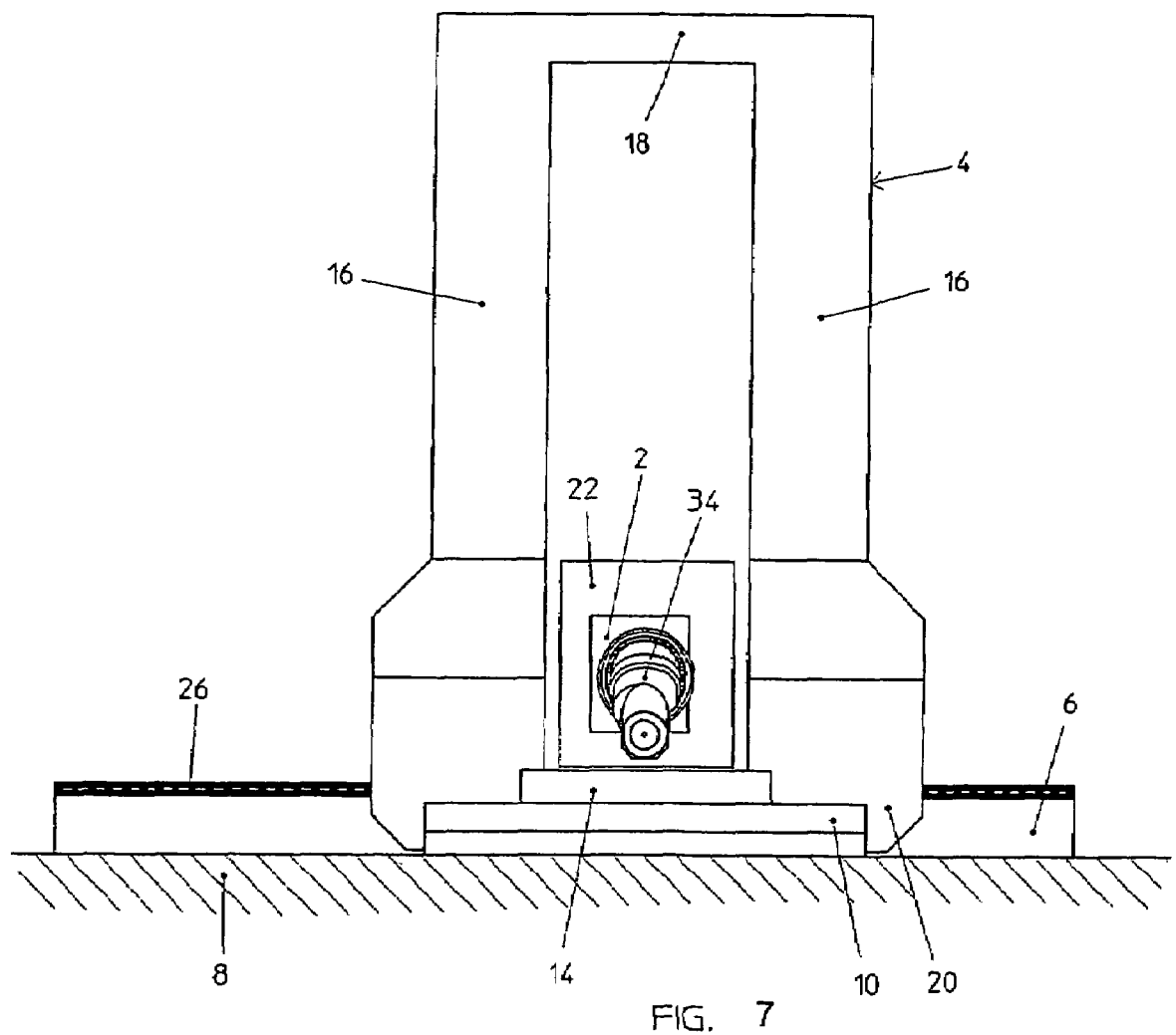
FIG. 7 shows it in the view VII-VII of FIG. 6.
Figure 8:
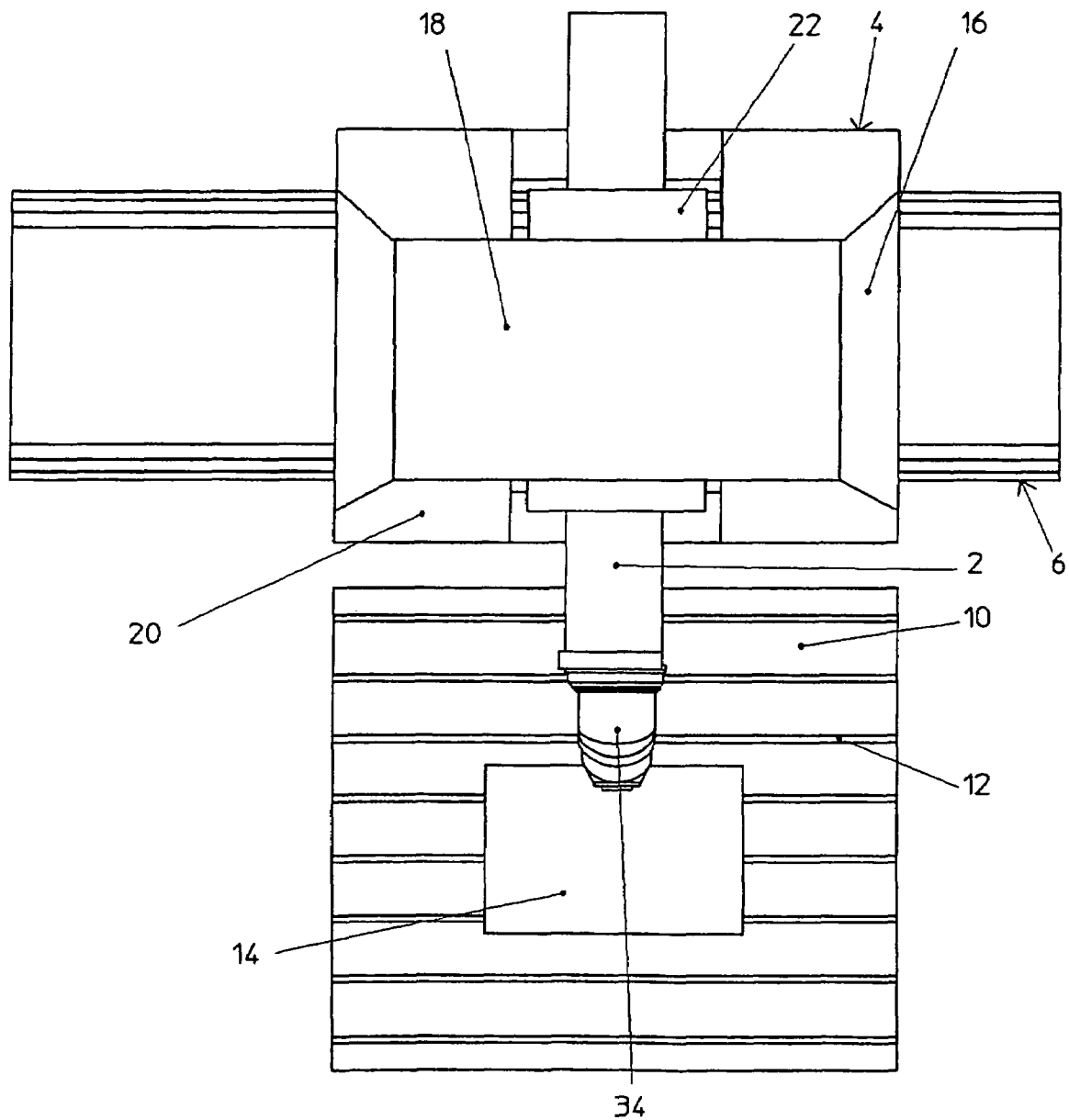
FIG. 8 shows it in plan view.

The column structure 4 slides along the bed 6 on guides 26, which can be positioned between the upper surface of the bed 6 and the lower surface of the column structure 4 (see FIG. 2).

Likewise, the traditional members for driving the column structure along the bed 6 can consist of a male-female screw combination 28 positioned on the upper surface of the bed 6, or a linear electric motor.

The bed 6 comprises a wide longitudinal recess 36 defining two longitudinal projections 38, on the upper surface of which the guides 26 are applied. Correspondingly, each of the two lower portions 19 of the columns 16 is provided with a lower appendix 40 intended to slide along the longitudinal recess 36 of the bed 6. The two appendices are advantageously joined together by a connecting and stiffening portion, also housed slidable within the longitudinal recess 36.

The aforedescribed machine is provided with traditional control systems enabling the tool head 34, mounted at that end of the slide 2 facing the work table 10, to undergo movement in accordance with the desired machining program which the machine has to carry out on the workpiece 14 positioned on the work table.

From the aforegoing it is apparent that the milling-boring machine of the invention is particularly advantageous compared with traditional machines, and in particular enables the spindle axis to reach a position very close to the work table 10 without the bed 6 having to be installed in a pit, and hence without requiring laborious and costly excavation work.

In addition it enables to further lessening the column dimensions and the rails 26 to be positioned between the facing lateral surfaces of the longitudinal recess 36 and of the appendices 40.

In the embodiment shown in FIGS. 5-8, in which corresponding parts are indicated by the same reference numerals, the two columns 16 of the portal column structure 4 are joined together by a pair of lower crosspieces 20, which extend downwards to externally embrace the two sides of the bed 6. These two lower crosspieces 20 define a portion positioned outside the corresponding side of the bed and extending upperly to join the two columns 16.

In this embodiment the driving members of the column structure 4 along the bed 6 can consist of a pinion 30/rack 32 combination positioned on the upper surface of the bed 6 or on a lateral surface of the bed 6.

This embodiment adds to the advantages of the preceding a greater robustness and a greater ease of construction while, as in the case of the second embodiment, enabling the guide rail 26 to be interposed between outer lateral surfaces of the bed 6 and the facing lateral surfaces of the lower crosspieces 20.

What is claimed is:

1. A horizontal milling-boring machine comprising:
   a monolithic horizontal bed anchored to the floor and separated from a work table,
   a portal formed column structure supported by the bed and slidable therealong along a longitudinal axis of the bed, said portal having two columns connected together by an upper crosspiece,
   a slide carriage slidable vertically along facing internal walls of said columns,
   a slide supporting a tool head and movable relative to said carriage along a longitudinal axis of the slide in a direction perpendicular to the longitudinal axis of said bed,
   guide means and drive means being interposed between said column structure and said bed, the guide means including rails positioned on an upper surface of the bed,
   wherein the two columns of the portal are lowerly connected through at least a crosspiece placed at a level at least partly lower than the lowermost upper surface of said bed, which at least a crosspiece is located outside of the area between the rails.

2. The milling-boring machine as claimed in claim 1, wherein the guide means consists of the rails.

3. The milling-boring machine as claimed in claim 1, wherein the drive means is between the rails.

4. The milling-boring machine as claimed in claim 1, wherein the drive means include a rack and a pinion.

5. The milling-boring machine as claimed in claim 4, wherein the drive means extend in the direction of the rails.

6. The milling-boring machine as claimed in claim 4, wherein the drive means are positioned between a lower surface of the portal formed column structure and an upper surface of the bed.

7. The milling-boring machine as claimed in claim 1, wherein the drive means consist of a rack rigid with said bed and at least one pinion rigid with said portal.

8. The milling-boring machine as claimed in claim 1, wherein the at least a cross piece extends in the direction of the longitudinal axis of the bed.

9. The milling-boring machine as claimed in claim 1, wherein the at least a crosspiece comprises a pair of crosspieces, and wherein the two columns of the portal formed structure are connected together by the pair of crosspieces which laterally embrace said bed.

10. The milling-boring machine as claimed in claim 1, wherein the guide rails are interposed between outer lateral surfaces of said bed.

11. The milling-boring machine as claimed in claim 1, wherein the at least a crosspiece comprises two crosspieces.

12. The milling-boring machine as claimed in claim 11, wherein the crosspieces extend lower than the guide rails.

* * * * *